R. M. SNYDER.
UTILIZING WASTE HEAT FROM OPEN HEARTH FURNACES.
APPLICATION FILED DEC. 27, 1915.
1,195,521.                                      Patented Aug. 22, 1916.
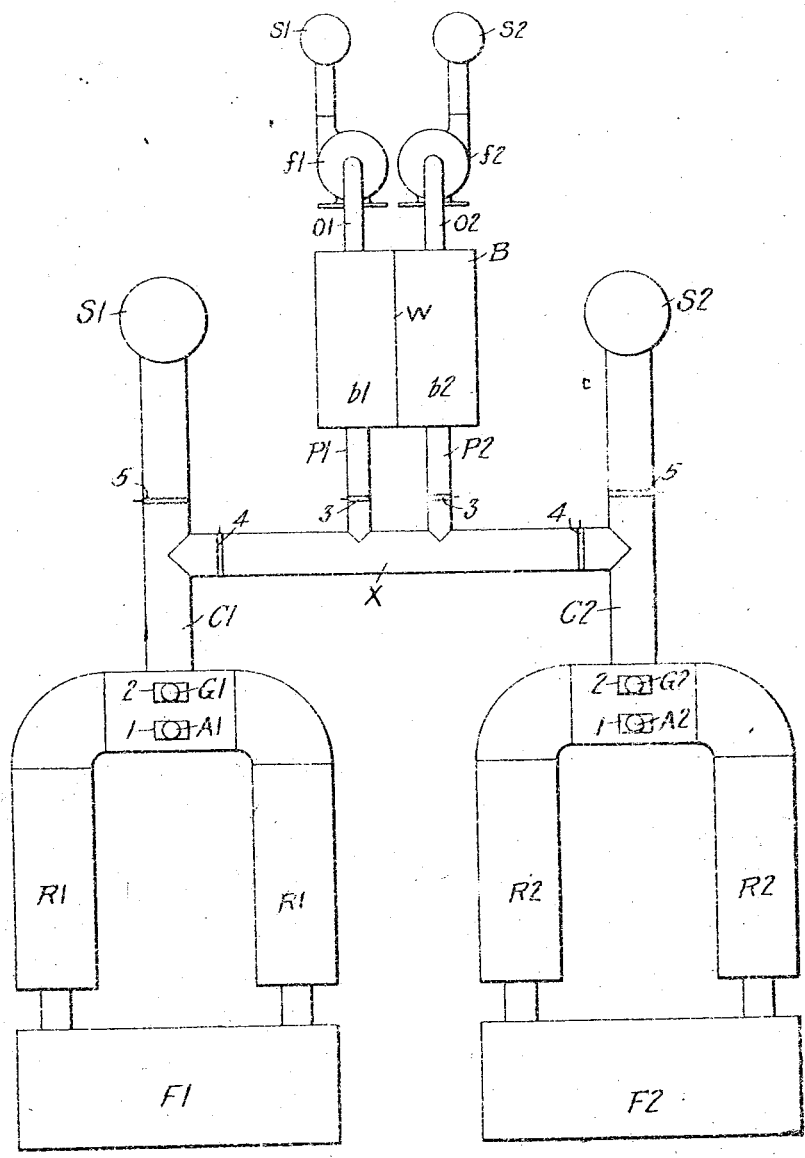

UNITED STATES PATENT OFFICE.

ROBERT M. SNYDER, OF WILKINSBURG, PENNSYLVANIA.

UTILIZING WASTE HEAT FROM OPEN-HEARTH FURNACES.

1,195,521.  Specification of Letters Patent.  Patented Aug. 22, 1916.

Application filed December 27, 1915. Serial No. 68,913.

*To all whom it may concern:*

Be it known that I, ROBERT M. SNYDER, a resident of Wilkinsburg, in the county of Allegheny and State of Pennsylvania, have invented a new and useful Improvement in Utilzing Waste Heat from Open-Hearth Furnaces, of which the following is a specification.

This invention relates to the utilization of waste heat from open hearth furnaces.

While attempts have been heretofore made to utilize the heat from open hearth furnaces, and in fact from various furnaces, they have never been successful, due to the variations or fluctuations in the quantity of heat per unit of time delivered to the place where the otherwise waste heat is utilized. These fluctuations are due primarily to the variation in volume of flow of the hot waste gases, which in turn is a result of the varying conditions in the open hearth furnace at different stages in its operation and the various necessary manipulations in the successful operation of such a furnace, all of which contribute more or less to the variation in the total volume of gases passing to the stack. Consequently the amount of heat delivered from a single open hearth furnace to the heat absorber where the otherwise waste heat is saved varies between wide limits.

The object of this invention is to enable the waste heat from open hearth furnaces to be recovered and utilized in an efficient manner by combining the output of waste gases from two adjacent open hearth furnaces, thereby equalizing the output into a more constant resultant, and to also reduce the sizes of boilers used for each of said two furnaces, as compared with the sizes of boilers ordinarily used with single furnaces, and furthermore to permit the waste gases from one or both of said furnaces to enter either a single boiler or two boilers, as desired.

The invention comprises the construction and arrangement of parts hereinafter described and claimed.

In the drawings, the figure is a diagrammatic view of one form of apparatus suitable for the invention.

According to my invention two adjacent open hearth furnaces are connected to a battery of two boilers operating as a unit, preferably in a manner to enable the waste gases from both of said furnaces to be delivered to either or both of the boilers of said battery.

Each open hearth furnace is provided with the usual regenerators for conserving its heat and utilizing it, so far as possible, in the furnace, the present invention relating wholly to the conservation and utilization of the otherwise waste heat which escapes from the discharge generators.

Referring to the drawings, $F^1$, $F^2$ indicate two adjacent open hearth furnaces, which may be of any suitable or preferred type or description and require no particular description. Each furnace is provided with its own regenerators, marked severally, $R^1$, $R^2$, which may be of any suitable form or description, as will be readily understood. The regenerators of said furnaces communicate with air inlets $A^1$, $A^2$ provided with reversing valves 1, with gas inlets $G^1$, $G^2$ provided with reversing valves 2, and through conduits $C^1$, $C^2$ with the usual stacks $S^1$, $S^2$. The several reversing valves 1 and 2 enable the air and gas supplies for each open hearth furnace to be delivered to said furnace through either of its sets of regenerators and discharged from said furnace thorugh the other set of regenerators, as is usual, and the air and gas supply conduits are also provided with suitable valves (not shown) for regulating the supplies of air and gas, as is usual.

The two adjacent open hearth furnaces shown are operated in conjunction with a suitable device for conserving and absorbing the otherwise waste heat of the gases delivered from the discharge regenerators. Said furnaces are shown as coöperating with a boiler unit B, which may be of any suitable form, such as a single boiler through which the waste gases from the two open hearth furnaces pass. Preferably, however, said boiler unit is a battery of two boilers $b^1$, $b^2$, the furnace chambers of which are divided by a wall W. Said chambers communicate with inlet pipes $P^1$, $P^2$, for supplying the waste gases thereto, and have outlet pipes $O^1$, $O^2$ communicating with two fans, $f^1$, $f^2$ of equal size and power, and which are adapted to draw the waste gases through the fire chambers of the boilers and deliver them to stacks $s^1$, $s^2$.

A suitable cross connection establishes communication between the two streams of waste gases passing away from the two open hearth furnaces. Said cross connection may be located anywhere between the regenerators $R^1$, $R^2$ and stacks $S^1$, $S^2$, and is shown as a pipe or conduit X connecting the two outlet pipes C¹ and C². Each of the inlet pipes P¹, P² communicates with said cross connecting conduit X, so that the fire chambers of both boilers b¹, b² receive their supplies of waste gases from the same source. Preferably, the inlet pipes P¹, P² are provided with valves 3, the cross connection X is provided with two valves 4 located between pipes P¹, P² and the two conduits C¹, C², and the conduits C¹ and C² are provided with valves 5.

The system described may be operated in several ways. The normal operation is when both boilers b¹, b² are in service, in which case valves 5 leading to the stacks S¹, S² are closed, and valves 3 and 4 are open. The fire chambers of the two boilers therefore take their supplies of waste gases from the same source, to wit, the pipe X, and as the fans f¹ and f² are of equal size and power, each boiler will receive an equal quantity of the waste gases, irrespective of fluctuations or variations in the volume of gases delivered from each of the two open hearth furnace systems. The said open hearth furnaces may therefore be operated absolutely independently of each other, each following the customary cycle of charging and drawing with the necessary reversals of the regenerators and variations in the working conditions in said furnaces. If one furnace, say furnace F¹, is delivering a larger supply of waste gas from its regenerator R¹ to the conduit C¹ than the other furnace F² to its conduit C², then there will be a flow of the waste gases from conduit C¹ to the pipe P², to correct the deficiency in the supply of waste gas to said pipe from the furnace F². If the furnace F² is delivering the larger quantity of gas, then the fan f¹ draws a portion of its supply from conduit C² to correct the deficiency in the supply from conduit C¹. Each boiler therefore operates under substantially uniform conditions with a maximum output of steam.

If it is necessary to put one of the two boilers, say b¹, out of service, valve 3 leading to said boiler is closed, and the waste gases from both of the conduits C¹, C² are delivered through pipe P² to furnace b².

With the usual arrangement, where the waste gases from one open hearth furnace are conducted to its individual boiler, said boiler is usually of about 600 horse power and in practice said boiler furnace actually delivers about 400 horse power. With my improved arrangement, the two boilers b¹, b² can each be of 500 horse power, and when both are in service, as before described, the system will produce 800 horse power due to the uniform heat effects produced at the boilers. When only a single boiler is in service, as just described, the large quantity of waste gases passing through the fire chamber of said boiler will operate it above rated efficiency and usually will furnish about 700 horse power, only slightly less than the horse power furnished by two open hearth furnaces operated with individual boilers. Therefore, even when working under disadvantageous conditions, with one boiler out of service, the present system is practically as efficient as the prior systems, and when operating under normal working conditions, or with both boilers in service, produces an increased horse power from boilers of lower rated capacity. The supply of steam produced in the two boilers is maintained substantially uniform, due to the equalized resultant obtained from the two open hearth furnaces.

What I claim is:—

1. In combination, two independent furnaces, each producing variable quantities of hot waste gases, two independent boilers, means for conducting the hot waste gases from each of said furnaces to a boiler, and cross connections between the waste gas supply means to said boilers whereby the supply of said gases to the two boilers is equalized notwithstanding fluctuations in the waste gases produced by each of said furnaces.

2. In combination, two independent furnaces, each producing variable quantities of hot waste gases, two independent boilers, means for conducting the hot waste gases from each of said furnaces to a boiler, cross connections between the waste gas supply means to said boilers whereby the supply of said gases to the two boilers is equalized notwithstanding fluctuations in the waste gases produced by each of said furnaces, and means associated with each of said boilers for drawing the waste gases therethrough.

3. In combination, two open hearth furnaces, a set of regenerators for each furnace, two boilers, means for conducting the hot waste gases from each of said furnaces to a boiler, and cross connections between the waste gas supply means to said boilers whereby the supply of said gases to said two boilers is equalized notwithstanding fluctuations in the waste gases produced by said two furnaces.

4. In combination, two open hearth furnaces, a set of regenerators for each furnace, two boilers, means for conducting the hot waste gases from each of said furnaces to a boiler, cross connections between the waste gas supply means to said boilers whereby the supply of said gases to said two boilers is equalized notwithstanding fluctuations in the waste gases produced by said two furnaces, and means associated with each of said boilers for drawing the waste gases therethrough.

5. In combination, two open hearth furnaces, a set of regenerators for each furnace, two boilers, two fans of equal power for drawing the hot gases through said boilers, a conduit communicating with said two sets of regenerators, and means for conducting the hot gases from said conduit to both of said boilers.

6. In combination, two open hearth furnaces, a set of regenerators for each furnace, two boilers, two fans of equal power for drawing the hot gases through said boilers, a conduit communicating with said two sets of regenerators, means for conducting the hot gases from said conduit to both of said boilers, and valves arranged to permit the gases in said conduit to be delivered to either or both of said boilers.

In testimony whereof, I have hereunto set my hand.

ROBERT M. SNYDER

Witnesses:
 ELBERT L. HYDE,
 GLENN H. ZERESCHE